US009371900B2

(12) United States Patent
Handa et al.

(10) Patent No.: US 9,371,900 B2
(45) Date of Patent: Jun. 21, 2016

(54) HOLLOW STRAIN WAVE GEARING

(71) Applicant: Harmonic Drive Systems Inc., Shinagawa-ku, Tokyo (JP)

(72) Inventors: Jun Handa, Azumino (JP); Yoshihide Kiyosawa, Azumino (JP)

(73) Assignee: HARMONIC DRIVE SYSTEMS INC., Shinagawa-Ku, Tokyo (JP)

( * ) Notice: Subject to any disclaimer, the term of this patent is extended or adjusted under 35 U.S.C. 154(b) by 0 days.

(21) Appl. No.: 14/429,704

(22) PCT Filed: Jul. 1, 2013

(86) PCT No.: PCT/JP2013/004076
§ 371 (c)(1),
(2) Date: Mar. 19, 2015

(87) PCT Pub. No.: WO2015/001582
PCT Pub. Date: Jan. 8, 2015

(65) Prior Publication Data
US 2015/0226302 A1    Aug. 13, 2015

(51) Int. Cl.
*F16H 49/00* (2006.01)
*F16H 57/021* (2012.01)

(52) U.S. Cl.
CPC ............ *F16H 49/001* (2013.01); *F16H 57/021* (2013.01); *F16H 2049/003* (2013.01); *Y10T 74/1987* (2015.01); *Y10T 74/19647* (2015.01)

(58) Field of Classification Search
CPC ............................ F16H 49/001; F16H 57/021
See application file for complete search history.

(56) References Cited

U.S. PATENT DOCUMENTS

2004/0245040 A1    12/2004    Eda et al.
2006/0191738 A1    8/2006    Eda et al.

FOREIGN PATENT DOCUMENTS

| JP | 09-280325 A | 10/1997 | |
| JP | 09-291983 A | 11/1997 | |
| JP | 2005-299837 A | 10/2005 | |
| JP | WO 2014203293 A1 * | 12/2014 | ............ F16H 49/001 |
| WO | WO 2003/047948 A1 | 6/2003 | |

OTHER PUBLICATIONS

International Search Report (PCT/ISA/210) mailed on Sep. 10, 2013, by the Japanese Patent Office as the International Searching Authority for International Application No. PCT/JP2013/004076.

* cited by examiner

*Primary Examiner* — Terence Boes
(74) *Attorney, Agent, or Firm* — Buchanan Ingersoll & Rooney PC

(57) ABSTRACT

A first shaft end of a hollow shaft of a hollow strain wave gearing is supported by a first support bearing with a collar interposed therebetween which is mounted to the outer-circumferential surface of the first shaft end. A second shaft end on the other end of the hollow shaft is supported by a second support bearing. A wave plug of a wave generator is integrally formed with the hollow shaft, and a wave bearing is mounted on the elliptical outer-circumferential surface thereof from the first-shaft-end side. It is possible to use a first support bearing having an inner diameter larger than the outer diameter of the first shaft end as the first support bearing for supporting the first shaft end.

4 Claims, 3 Drawing Sheets

HOLLOW STRAIN WAVE GEARING

TECHNICAL FIELD

The present invention relates to a hollow strain wave gearing. Specifically, the present invention relates to a hollow strain wave gearing in which a wave generator plug is integrally formed on a hollow shaft defining a hollow part that passes through the hollow strain wave gearing along the central-axis direction thereof, and both shaft end parts of the hollow shaft are supported by support bearings.

BACKGROUND ART

There are known hollow strain wave gearings which comprise a hollow shaft defining a hollow part that extends through the hollow strain wave gearing along the central-axis direction thereof, and which are configured such that an ellipsoidally contoured wave plug of a wave generator is integrally formed along the outer peripheral surface of the hollow shaft. Patent Document 1 discloses a hollow strain wave gearing comprising a top-hat-shaped flexible externally toothed gear.

In a hollow strain wave gearing of such configuration, both shaft end parts of the hollow shaft are supported by support bearings. The wave generator is configured from the wave plug integrally formed along the outer peripheral surface of the hollow shaft, and a wave bearing fitted on the ellipsoidal outer peripheral surface of the wave plug. The wave bearing comprises inner and outer flexible races capable of flexing along the radial direction.

The wave bearing is mounted in the following manner. A shaft end on one side of the hollow shaft is passed through the wave bearing, and the wave bearing is moved along the outer peripheral surface of the hollow shaft to the wave plug and is mounted on the ellipsoidal outer peripheral surface of the wave plug. The outside diameter of the shaft part extending from the shaft end on one side of the hollow shaft to the wave plug must be made smaller than the inside diameter of the wave bearing. Typically, the outside diameter of the shaft part is made smaller than the minor axis of the ellipsoidal outer peripheral surface of the wave plug to allow the wave bearing to be mounted.

PRIOR ART DOCUMENT

Patent Document

[Patent Document 1] JP-A 09-291983

SUMMARY OF THE INVENTION

Problems to be Solved by the Invention

In order for the wave bearing to be mounted, the outside diameter of a shaft part on a shaft end on one side of the hollow shaft cannot be increased in size. However, because the support bearing supporting the wave-bearing-mounting side end part of the hollow shaft is attached to the low-diameter shaft part, the support bearing must have a small inside diameter. It is impossible to use a large support bearing offering robust support performance. Additionally, because the outside diameter of the shaft part cannot be increased in size, the hollow diameter of the hollow shaft also cannot be increased in size.

An object of the present invention is to provide a hollow strain wave gearing comprising a support bearing having an inside diameter larger than the outside diameter of the shaft part on the side of the hollow shaft on which the wave bearing is mounted.

Means to Solve the Problems

The hollow strain wave gearing of the present invention is characterized in comprising:
a hollow shaft;
a wave generator having an ellipsoidally contoured wave plug formed on the outer peripheral surface of the hollow shaft, and a wave bearing fitted on the ellipsoidal outer peripheral surface of the wave plug from a first shaft end part of the hollow shaft;
a cylindrical collar mounted on the outer peripheral surface of the first shaft end part;
a first support bearing for supporting the first shaft end part on the hollow shaft with the collar interposed therebetween; and
a second support bearing for supporting a second shaft end part of the hollow shaft.

In the present invention, the collar is mounted on the outer peripheral surface of the first shaft end part on the side on which the wave bearing is mounted, and the first support bearing is mounted on the outer peripheral surface of the collar. It is possible to employ a first support bearing having an inside diameter larger than the outside diameter of the first shaft end part, and the capacity for supporting the hollow shall is improved. Specifically, there is no restriction on the size of the first support bearing caused by the mounting of the wave bearing. Accordingly, it is possible to use a first support bearing having an inside diameter larger than the minor axis of the ellipsoidal outer peripheral surface of the wave plug of the wave generator.

Additionally, because a collar is mounted on the first shaft end part of the hollow shaft supported by the first support bearing, the first shaft end part is reinforced by the collar. Accordingly, the wall thickness of the first shaft end part can be reduced, whereby the inside diameter of the hollow shaft can be increased.

In the hollow strain wave gearing of the present invention, the collar preferably comprises a first inner-race-restricting surface that contacts an inner race of the wave bearing from the central-axis direction of the hollow strain wave gearing and/or a second inner-race-restricting surface that contacts an inner race of the first support bearing from the central-axis direction of the hollow strain wave gearing.

Using the collar as an inner-race-restricting member obviates having to attach a separate member for restricting the wave bearing or the first support bearing. Accordingly, increases in the number of components can be minimized, and the manufacturing cost can be reduced.

When used as a unit, the hollow strain wave gearing of the present invention comprises:
a first unit end plate disposed at a side of the first shaft end part along the central-axis direction of the hollow strain wave gearing, the first support bearing being attached to the first unit end plate;
a second unit end plate disposed at a side of the second shaft end part along the central-axis direction of the hollow strain wave gearing, the second support bearing being attached to the second unit end plate;
a rigid internally toothed gear disposed between the first and second unit end plates, the rigid internally toothed gear rotating integrally with the first unit end plate;
a flexible externally toothed gear disposed on the inner side of the rigid internally toothed gear between the first and second unit end plates, the flexible externally toothed gear rotating integrally with the second unit end plate; and a unit bearing for supporting, in a relatively rotatable manner, the rigid internally toothed gear and the flexible externally toothed gear.

When a large hollow part is formed, a silk-hat-shaped flexible externally toothed gear is used as the flexible externally toothed gear. The silk-hat-shaped flexible externally toothed gear comprises: a cylindrical barrel part; a diaphragm extending radially outward, the diaphragm being continuous with the end of the cylindrical barrel part toward the second unit end plate; an annular boss formed continuously with the outer peripheral edge of the diaphragm; and external teeth formed on an outer peripheral surface part on the cylindrical barrel part toward the first unit end plate. In this case, the wave generator is mounted on the inner side of an externally toothed portion on which the external teeth of the cylindrical barrel part are formed, the externally toothed portion being caused to flex ellipsoidally. The boss is secured to the second unit end plate together with an outer race of the unit bearing. The rigid internally toothed gear is secured to the first unit end plate together with an inner race of the unit bearing. Alternatively, the rigid internally toothed gear, the inner race, and the first unit end plate may be integrally formed as a single component.

MODE FOR CARRYING OUT THE INVENTION

An embodiment of a hollow strain wave gearing to which the present invention has been applied is described below with reference to the annexed drawings.

(Overall Configuration)

Figure 1:
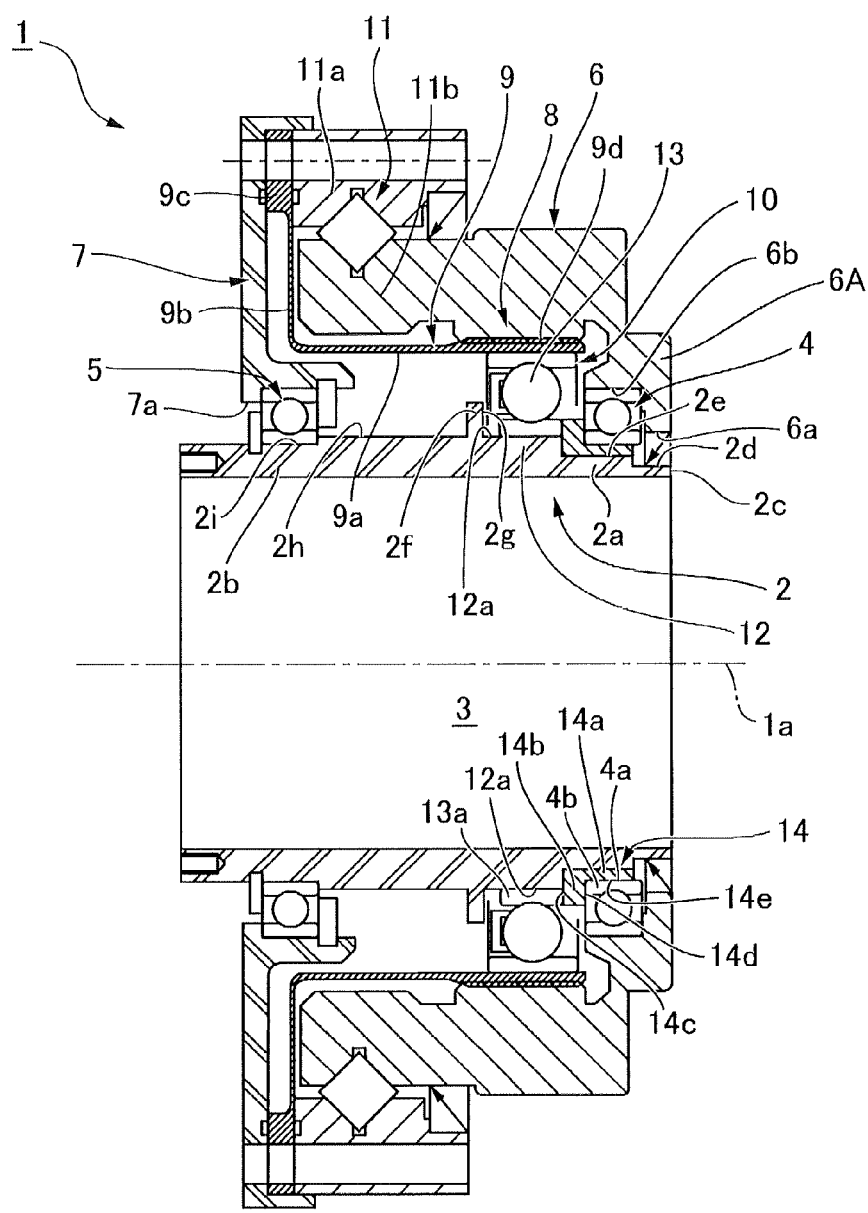
FIG. 1 is a longitudinal cross-sectional view showing a hollow strain wave gearing to which the present invention has been applied.
Figure 2:
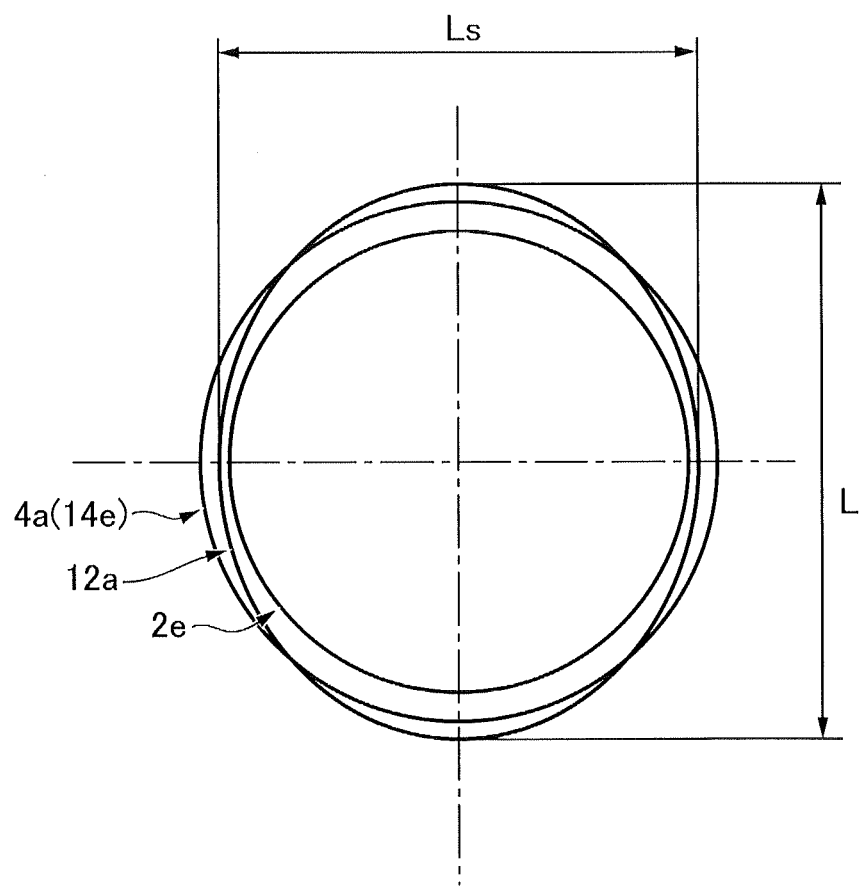
FIG. 2 is a schematic view showing the outer-diameter dimensions of the parts of the hollow strain wave gearing of FIG. 1.

FIG. 1 is a longitudinal cross-sectional view of a hollow strain wave gearing to which the present invention has been applied, and FIG. 2 is a schematic view showing the outer-diameter dimensions of the parts of the hollow strain wave gearing. The hollow strain wave gearing 1 comprises a hollow shaft 2 extending along the direction of the gearing central-axis 1a. The hollow shaft 2 is an input shaft by which high-speed rotation is inputted from a motor or the like, and a hollow part 3 of circular cross-section is formed in the interior of the hollow shaft 2 so as to pass through the hollow strain wave gearing along the direction of the gearing central-axis 1a. A first shaft end part 2a on one side of the hollow shaft 2 is supported by a first support bearing 4, and a second shaft end part 2b on the other side of the hollow shaft 2 is supported by a second support bearing 5. The first and second support bearings 4, 5 are, e.g., ball bearings. The first support bearing 4 is attached to a discoid first unit end plate 6A integrally formed with one end part of a housing 6. The second support bearing 5 is attached to a discoid second unit end plate 7.

A rigid internally toothed gear 8, a silk-hat-shaped flexible externally toothed gear 9, and a wave generator 10 are disposed between the first and second unit end plates 6A, 7. The rigid internally toothed gear 8 is integrally formed as a part of the housing 6. The flexible externally toothed gear 9 is secured to the second unit end plate 7. The rigid internally toothed gear 8 and the flexible externally toothed gear 9 are supported by a unit bearing 11 so as to be capable of relatively rotating. The unit bearing 11 is, e.g., a cross roller bearing.

The flexible externally toothed gear 9 is caused to flex ellipsoidally by the wave generator 10, so that the flexible externally toothed gear 9 meshes with the rigid internally toothed gear 8 at portions on both ends of the major axis of the ellipsoidal shape. The number of teeth of the flexible externally toothed gear 9 is 2n less than the number of teeth of the rigid internally toothed gear 8, n being a positive integer. Typically there are two fewer teeth. When the wave generator 10 rotates, the positions at which the two gears 8, 9 mesh move along the circumferential direction, and relative rotation is generated in accordance with the difference in the number of teeth between the two gears. When the rigid internally toothed gear 8 is secured so as not to rotate, the flexible externally toothed gear 9 rotates, and output of reduced rotation can be elicited from the second unit end plate 7 secured thereto.

(Configuration of Parts)

The wave generator 10 comprises an ellipsoidally contoured wave plug 12 of fixed width, and a wave bearing 13 fitted on the ellipsoidal outer peripheral surface 12a of the wave plug 12. The wave plug 12 is integrally formed with a portion of the shaft part of the hollow shaft 2 positioned between the first and second unit end plates 6A, 7, the portion being adjacent to the first support bearing 4. The wave bearing 13 is a ball bearing or other type of bearing that has radially flexible inner and outer races.

The wave bearing 13 is mounted on the hollow shaft 2 from the first shaft end part 2a on one side of the hollow shaft 2, and is fitted on the ellipsoidal outer peripheral surface 12a of the wave plug 12. Therefore, the outside diameter of the shaft part extending from the first shaft end part 2a on one side of the hollow shaft 2 to the wave plug 12 is less than the inside diameter of the wave bearing 13 (measured while the wave bearing 13 is in a circular state prior to being ellipsoidally flexed).

In the present example, as shown in FIG. 2, the outside diameter of a circular outer peripheral surface 2e of the first shaft end part 2a is less than the minor axis Ls of the ellipsoidal outer peripheral surface 12a of the wave plug 12. Between the circular outer peripheral surface 2e and a shaft end 2c is a circular outer peripheral surface 2d of even smaller diameter. A cylindrical collar 14 is mounted on the circular outer peripheral surface 2e of the first shaft end part 2a. The collar 14 comprises a cylindrical collar body part 14a, and a large-diameter annular flange part 14b formed on an end part toward the second shaft end part 2b of the collar body part 14a. An end surface of the flange part 14b contacts an annular stepped surface between the circular outer peripheral surface 2e and the ellipsoidal outer peripheral surface 12a of the wave plug 12, determining the axial-direction positioning of the collar 14.

The first support bearing 4 is mounted on a circular outer peripheral surface of the collar body part 14a of the collar 14. The flange part 14b of the collar 14 is interposed between an inner race 13a of the wave bearing 13 and an inner race 4b of the first support bearing 4. Therefore, annular end surfaces 14c, 14d on the two sides of the flange part 14b function as an inner-race-restricting surface with regard to the wave bearing 13 and an inner-race-restricting surface with regard to the first support bearing 4, respectively.

The first support bearing 4 supports the first shaft end part 2a of the hollow shaft 2 with the collar 14 interposed therebetween. Therefore, the inside diameter of the first support bearing 4 is the same as the outside diameter of a circular outer peripheral surface 14e of the collar body part 14a of the collar 14, and is greater than the outside diameter of the first shaft end part 2a, which is less than the minor axis Ls of the ellipsoidal outer peripheral surface 12a of the wave plug 12. In the present example, as shown in FIG. 2, a ball bearing comprising a circular inner peripheral surface 4a having an inside diameter which is greater than the minor axis Ls of the ellipsoidal outer peripheral surface 12a of the wave plug 12 and slightly less than the major axis L of the ellipsoidal outer peripheral surface 12a is used as the first support bearing 4.

A large-diameter annular flange 2f is formed on the side of the wave plug 12 facing the second shaft end part 2b along the hollow shaft 2, An annular end surface 2g of the flange 2f functions as a retainer-restricting surface with regard to the wave bearing 13. A circular outer peripheral surface 2h having an outside diameter which is approximately the same as the major axis of the ellipsoidal outer peripheral surface 12a of the wave plug 12 is formed on the hollow shaft adjacently with respect to the flange 2f. A circular outer peripheral surface 2i adjacent to the circular outer peripheral surface 2h is the circular outer peripheral surface of the second shaft end part 2b, the second support bearing 5 being mounted on the circular outer peripheral surface 2i, For example, the outside diameter of the circular outer peripheral surface 2i is the same as the outside diameter of the collar body part 14a of the collar 14, and a ball bearing of the same size as the first support bearing 4 is used as the second support bearing 5.

In the present embodiment, the hollow part 3 of the hollow shaft 2 has the same inside diameter along the axial direction. The outside diameter of the circular outer peripheral surface 2e of the first shaft end part 2a of the hollow shaft 2 supported by the first support bearing 4 is set to a small diameter in order for the first shaft end part 2a to pass through the wave bearing 13; therefore, the wall thickness of the first shaft end part 2a is less than the wall thickness of the second shaft end part 2b. However, because the collar 14 is mounted on the first shaft end part 2a, the first shaft end part 2a is reinforced by the collar 14 even when the hollow part 3 is formed to have the same inside diameter; therefore, sufficient strength and rigidity are ensured. Accordingly, the hollow diameter can be increased to a greater degree than in a prior art hollow strain wave gearing, in which it is necessary to make the small-diameter first shaft end part 2a so as to be sufficiently thick.

The silk-hat-shaped flexible externally toothed gear 9 comprises: a radially flexible cylindrical barrel part 9a; a diaphragm 9b extending radially outward, the diaphragm being continuous with the end of the cylindrical barrel part 9a toward the second unit end plate 7; an annular boss 9e formed continuously with the outer peripheral edge of the diaphragm 9b; and external teeth 9d formed on an outer peripheral surface part of the cylindrical barrel part 9a toward the first unit end plate 6A. The wave generator 10 is mounted on the inner side of an ellipsoidally flexed externally toothed portion on which the external teeth 9d of the cylindrical barrel part 9a are formed.

The boss 9c is interposed between the second unit end plate 7 and an outer race 11a of the unit bearing 11, in which state the three members are securely fastened by a plurality of fastening bolts (not shown).

An inner race 11b of the unit bearing 11 is integrally formed on a portion of the housing 6 on a side of the rigid internally toothed gear 8 opposite from the first unit end plate 6A. The rigid internally toothed gear 8 of the housing 6 surrounds the external teeth 9d of the flexible externally toothed gear 9, and the inner race 11b surrounds a portion of the cylindrical barrel part 9a of the flexible externally toothed gear 9 excluding the external teeth 9d. In the present example, the first unit end plate 6A, the rigid internally toothed gear 8, and the inner race 11b are formed by the housing 6, which is a single component. Alternatively, the first unit end plate 6A, the rigid internally toothed gear 8, and the inner race 11b can be manufactured as individual components, and then be securely fastened using a bolt or another fastening member.

A circular central through-hole 6a is formed in the central part of the first unit end plate 6A, the end of the hollow shaft 2 toward the first shaft end part 2a being exposed through the central through-hole 6a. Formed on the inner side of the central through-hole 6a along the gearing central axis is a circular inner peripheral surface 6b having an inside diameter greater than that of the central through-hole 6a, the first support bearing 4 being attached to the circular inner peripheral surface 6b. A circular through-hole 7a is formed in the central part of the second unit end plate 7, and the second support bearing 5 is attached to the inner side of the circular through-hole 7a. The end portion of the second shaft end part 2b of the hollow shaft 2 supported by the second support bearing 5 protrudes outward from the second unit end plate 7. A motor shaft or the like is securely coupled with the end portion of the hollow shaft 2 via a coupling.

Figure 3:
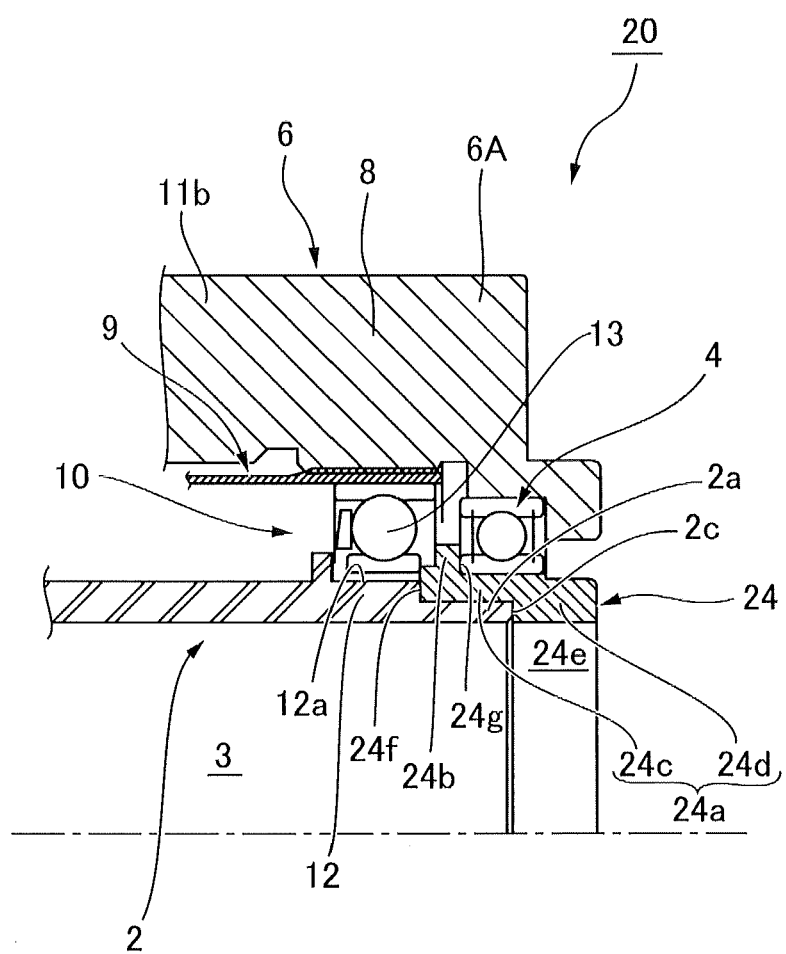
FIG. 3 is a partial cross-sectional view showing a case in which a collar of a shape different than that shown in FIG. 1 is used.

FIG. 3 is a partial cross-sectional view showing a hollow strain wave gearing in which a collar of a different shape is attached. The overall configuration of the hollow strain wave gearing 20 shown in FIG. 3 is the same as that of the hollow strain wave gearing 1 of FIG. 1; therefore, corresponding portions are given the same symbols, and are not described.

In the hollow strain wave gearing 20, a collar 24 attached to a first shaft end part 2a of a hollow shaft 2 comprises a cylindrical collar body part 24a and a large-diameter annular flange part 24b formed on an end part of the collar body part 24a toward the second shaft end part 2b.

The collar body part 24a comprises a cylindrical portion 24c mounted on a circular outer peripheral surface of the first shaft end part 2a, and a cylindrical portion 24d extending coaxially from a shaft end 2c of the first shaft end part 2a. A hollow part 24e of the cylindrical portion 24d has the same inside diameter as a hollow part 3 of the hollow shaft 2, a hollow part being formed in the hollow strain wave gearing 20 by the hollow part 3 and the hollow part 24e. An annular end surface 24f of the cylindrical portion 24c and an annular end surface 24g of the flange part 24b function as an inner-race-restricting surface with regard to a wave bearing 13 and an inner-race-restricting surface with regard to a first support bearing 4, respectively.

The invention claimed is:

1. A hollow strain wave gearing comprising:
   a hollow shaft;
   a wave generator having an ellipsoidally contoured wave plug formed on an outer peripheral surface of the hollow shaft, and a wave bearing fitted on an ellipsoidal outer peripheral surface of the wave plug from a first shaft end part of the hollow shaft;
   a cylindrical collar mounted on an outer peripheral surface of the first shaft end part;
   a first support bearing for supporting the first shaft end part of the hollow shaft with the collar interposed therebetween; and
   a second support bearing for supporting a second shaft end part of the hollow shaft;
   wherein an inside diameter of a circular inner peripheral surface of the first support bearing is larger than a minor axis of the ellipsoidal outer peripheral surface of the wave plug.

2. A hollow strain wave gearing comprising:
a hollow shaft;
a wave generator having an ellipsoidally contoured wave plug formed on an outer peripheral surface of the hollow shaft, and a wave bearing fitted on an ellipsoidal outer peripheral surface of the wave plug from a first shaft end part of the hollow shaft;
a cylindrical collar mounted on an outer peripheral surface of the first shaft end part;
a first support bearing for supporting the first shaft end part of the hollow shaft with the collar interposed therebetween; and
a second support bearing for supporting a second shaft end part of the hollow shaft;
wherein the collar has at least one of a first inner-race-restricting surface and a second inner-race-restricting surface, in which the first inner-race-restricting surface contacts an inner race of the wave bearing in a direction of a gearing central-axis, and the second inner-race-restricting surface contacts an inner race of the first support bearing in the direction of the gearing central axis.

3. The hollow strain wave gearing according to claim 1, further comprising:
a first unit end plate disposed at a side of the first shaft end part along the direction of the gearing central axis, the first support bearing being attached to the first unit end plate;
a second unit end plate disposed at a side of the second shaft end part along the direction of the gearing central axis, the second support bearing being attached to the second unit end plate;
a rigid internally toothed gear disposed between the first and second unit end plates, and being integrally rotatable with the first unit end plate;
a flexible externally toothed gear disposed on an inner side of the rigid internally toothed gear between the first and second unit end plates, and being integrally rotatable with the second unit end plate; and
a unit bearing for supporting, in a relatively rotatable manner, the rigid internally toothed gear and the flexible externally toothed gear, wherein
the flexible externally toothed gear is flexed ellipsoidally and partially meshes with the rigid internally toothed gear.

4. The hollow strain wave gearing according to claim 3 wherein
the flexible externally toothed gear comprises:
a cylindrical barrel part;
a diaphragm formed continuously with an end of the cylindrical barrel part at a side of the second unit end plate and extending radially outward;
an annular boss formed continuously with an outer peripheral edge of the diaphragm; and
external teeth formed on an outer peripheral surface part on the cylindrical barrel part at a side of the first unit end plate, and wherein
the wave generator is mounted on an inner side of an externally toothed portion on which the external teeth of the cylindrical barrel part are formed, and the externally toothed portion is flexed ellipsoidally,
the boss is secured to the second unit end plate together with an outer race of the unit bearing, and
the rigid internally toothed gear is secured to the first unit end plate together with an inner race of the unit bearing, or the rigid internally toothed gear, the inner race, and the first unit end plate are integrally formed as a single component.

* * * * *